US012647690B1

(12) United States Patent
Chang et al.

(10) Patent No.: US 12,647,690 B1
(45) Date of Patent: Jun. 2, 2026

(54) MULTI-CAMERA UNIT STRUCTURE AND DEVICE

(71) Applicant: Kneron (Taiwan) Co., Ltd., Taipei City (TW)

(72) Inventors: Su-Yu Chang, Hsinchu City (TW); Bike Xie, San Diego, CA (US); HsiangTsun Li, San Diego, CA (US); Yi-Liang Lai, Yilan County (TW); Wei-Lun Kuo, Miaoli County (TW)

(73) Assignee: KNERON (TAIWAN) CO., LTD., Taipei City (TW)

( * ) Notice: Subject to any disclaimer, the term of this patent is extended or adjusted under 35 U.S.C. 154(b) by 64 days.

(21) Appl. No.: 18/964,156

(22) Filed: Nov. 29, 2024

(51) Int. Cl.
*H04N 23/90* (2023.01)
*H04N 23/55* (2023.01)
*H04N 23/951* (2023.01)

(52) U.S. Cl.
CPC ............. *H04N 23/90* (2023.01); *H04N 23/55* (2023.01); *H04N 23/951* (2023.01)

(58) Field of Classification Search
CPC ....... H04N 23/90; H04N 23/55; H04N 23/951
See application file for complete search history.

(56) References Cited

U.S. PATENT DOCUMENTS

| | | | | |
|---|---|---|---|---|
| 10,097,812 | B2 * | 10/2018 | Livyatan ................. | G06F 18/22 |
| 10,924,670 | B2 * | 2/2021 | Liu ....................... | H04N 23/667 |
| 11,017,546 | B2 * | 5/2021 | Navarro Fructuoso ..................... | |
| | | | | G06T 7/593 |
| 11,270,467 | B2 * | 3/2022 | Devitt ................... | G06T 1/0007 |
| 11,546,571 | B1 * | 1/2023 | Lin ....................... | H04N 13/282 |
| 11,652,978 | B2 * | 5/2023 | Wu ....................... | H04N 13/296 |
| | | | | 348/139 |
| 12,288,363 | B2 * | 4/2025 | Sen ........................ | G01S 7/497 |
| 2017/0178354 | A1 * | 6/2017 | Wendler ................... | G06T 7/85 |
| 2017/0223339 | A1 * | 8/2017 | Kondo ..................... | G06T 7/55 |
| 2018/0227575 | A1 * | 8/2018 | Wu ....................... | G06T 7/596 |
| 2021/0211635 | A1 * | 7/2021 | Shapira ................... | G02B 30/22 |
| 2021/0247621 | A1 * | 8/2021 | Yang ..................... | H04N 23/57 |
| 2021/0352259 | A1 * | 11/2021 | Jiang .................... | H04N 17/002 |
| 2022/0163398 | A1 * | 5/2022 | Cho ......................... | G01J 5/53 |
| 2023/0252661 | A1 * | 8/2023 | Zhu ............................ | G06T 7/55 |
| | | | | 382/100 |
| 2024/0161341 | A1 * | 5/2024 | Sen ........................ | G01S 17/931 |

FOREIGN PATENT DOCUMENTS

| | | |
|---|---|---|
| TW | 201717613 A | 5/2017 |
| TW | 201729585 A | 8/2017 |

* cited by examiner

*Primary Examiner* — Chiawei Chen
(74) *Attorney, Agent, or Firm* — MUNCY, GEISSLER, OLDS & LOWE, P.C.

(57) ABSTRACT

A multi-camera unit structure includes a first camera unit, a second camera unit, a third camera unit and a calibrated-image generation unit. The second camera unit is distant from the first camera unit with a first distance in a first direction. With taking the first camera unit as an imaging reference, the first and the second camera units obtain a first DOF image of a target object. The third camera unit is distant from the first camera unit with a second distance in a second direction. The first and second directions define an included angle. With taking the first camera unit as an imaging reference, the third and the first camera units obtain a second DOF image of the target object. The calibrated-image generation unit obtains a calibrated DOF image according to the first and the second DOF images.

12 Claims, 4 Drawing Sheets

100

10

10

20

20

MULTI-CAMERA UNIT STRUCTURE AND DEVICE

BACKGROUND

Technology Field

The present disclosure relates to a camera structure and device, and in particular to a multi-camera unit structure and device with an image calibration function.

Description of Related Art

In the imaging technology, the depth estimation of image or 3D image reconstruction is usually carried out by using a dual camera structure, which can simulate the two eyes (left and right eyes) vision. However, for some special images including the scenes with, for example, textureless areas, reflective areas, or shading areas, the generated image may be unclear. In other words, there are still many problems in the conventional imaging technology.

In addition, after using the conventional dual camera structure to capture an image, it is necessary to perform considerable calibrations and corrections to obtain a 3D image. However, even if the considerable calibrations and corrections are performed, it may still have some slight errors in the calibrations and corrections, which may cause excessive errors in the depth map and 3D model. Therefore, it is desired to provide a modified camera structure that can achieve systematic calibration and correction to obtain more accurate 3D images.

SUMMARY

An objective of this disclosure is to provide a multi-camera unit structure and device that can generate a calibrated DOF (depth of field) image based on a first DOF image and a second DOF image, thereby obtaining a more accurate depth image and a more accurate 3D model.

To achieve the above, the present disclosure provides a multi-camera unit structure, which includes a first camera unit, a second camera unit, a third camera unit and a calibrated-image generation unit. The second camera unit is distant from the first camera unit with a first distance in a first direction. The first direction is defined by the first camera unit and the second camera unit. The first camera unit and the second camera unit, with taking the first camera unit as an imaging reference, obtain a first DOF image of a target object. The third camera unit is distant from the first camera unit or the second camera unit with a second distance in a second direction. The second direction is defined by the third camera unit and the first camera unit or by the third camera unit and the second camera, and the first direction and the second direction define an included angle. The third camera unit and the first camera unit, with taking the first camera unit as an imaging reference, obtain a second DOF image of the target object, or the third camera unit and the second camera unit, with taking the second camera unit as an imaging reference, obtain the second DOF image of the target object. The calibrated-image generation unit obtains a calibrated DOF image according to the first DOF image and the second DOF image.

In one embodiment, the included angle defined by the first direction and the second direction is 90°.

In one embodiment, the multi-camera unit structure further includes a first rail unit extending in the first direction, and each of the first camera unit and the second camera unit is arranged on the first rail unit through a position member.

In one embodiment, the multi-camera unit structure further includes a second rail unit extending in the second direction, and the third camera unit is arranged on the second rail unit through a position member.

In one embodiment, the calibrated-image generation unit obtains the calibrated DOF image according to multiple DOF data of corresponding pixel areas in the first DOF image and the second DOF image having higher confidences.

To achieve the above, the present disclosure also provides a multi-camera unit device, which includes a first camera unit, a second camera unit, a third camera unit, a calibrated-image generation unit, and a casing. The second camera unit is distant from the first camera unit with a first distance in a first direction. The first direction is defined by the first camera unit and the second camera unit. The first camera unit and the second camera unit, with taking the first camera unit as an imaging reference, obtain a first DOF image of a target object. The third camera unit is distant from the first camera unit or the second camera unit with a second distance in a second direction. The second direction is defined by the third camera unit and the first camera unit or by the third camera unit and the second camera, and the first direction and the second direction define an included angle. The third camera unit and the first camera unit, with taking the first camera unit as an imaging reference, obtain a second DOF image of the target object, or the third camera unit and the second camera unit, with taking the second camera unit as an imaging reference, obtain the second DOF image of the target object. The calibrated-image generation unit obtains a calibrated DOF image according to the first DOF image and the second DOF image. The first camera unit, the second camera unit, the third camera unit and the calibrated-image generation unit are disposed in the casing.

In one embodiment, the included angle defined by the first direction and the second direction is 90°.

In one embodiment, the multi-camera unit device further includes a first rail unit disposed in the casing and extending in the first direction, and each of the first camera unit and the second camera unit is arranged on the first rail unit through a position member.

In one embodiment, the multi-camera unit device further includes a second rail unit disposed in the casing and extending in the second direction, and the third camera unit is arranged on the second rail unit through a position member.

In one embodiment, the calibrated-image generation unit obtains the calibrated DOF image according to multiple DOF data of corresponding pixel areas in the first DOF image and the second DOF image having higher confidences.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
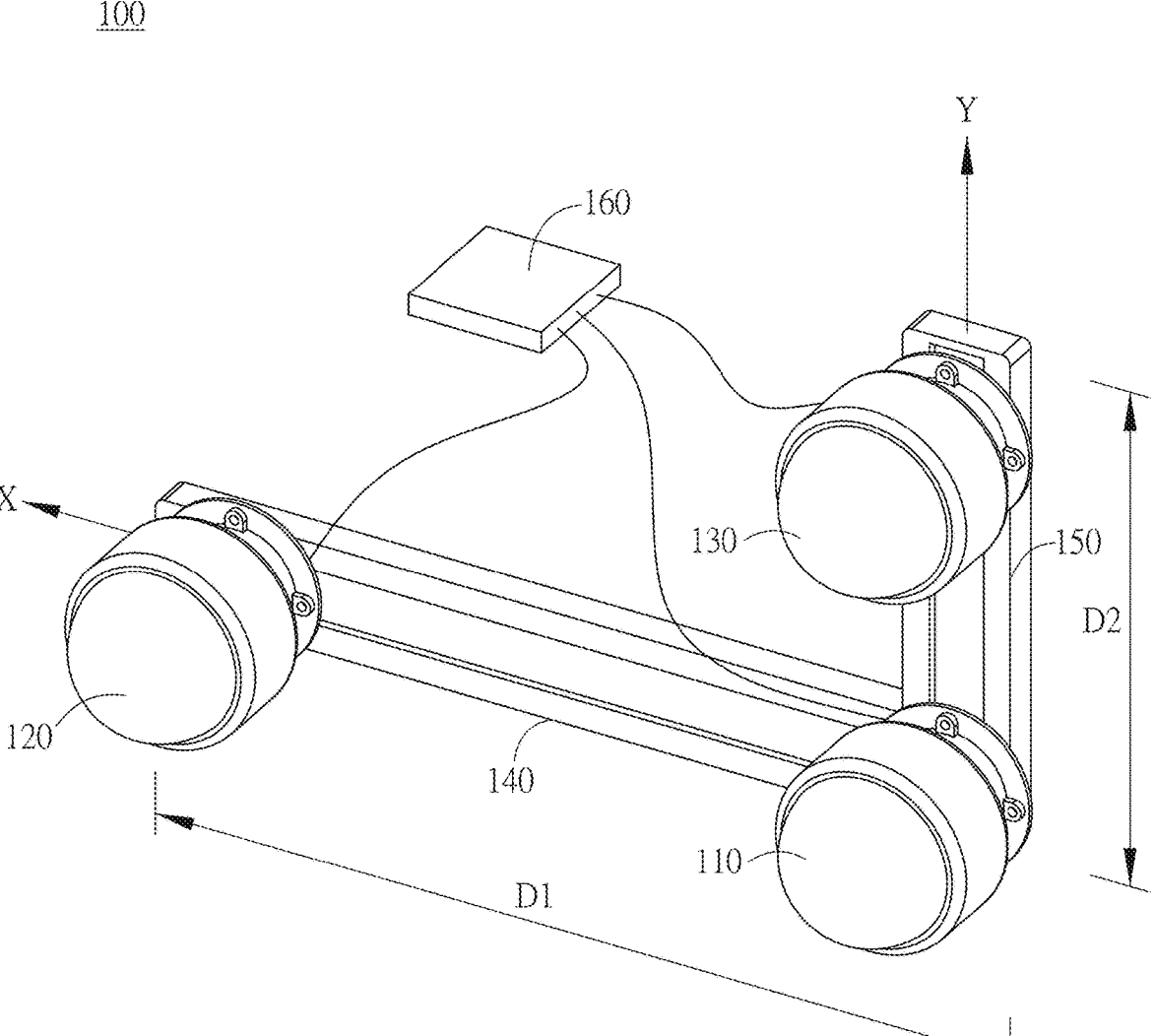
FIG. 1 is a schematic diagram showing a multi-camera unit structure according to an embodiment of this disclosure.
Figure 2A:
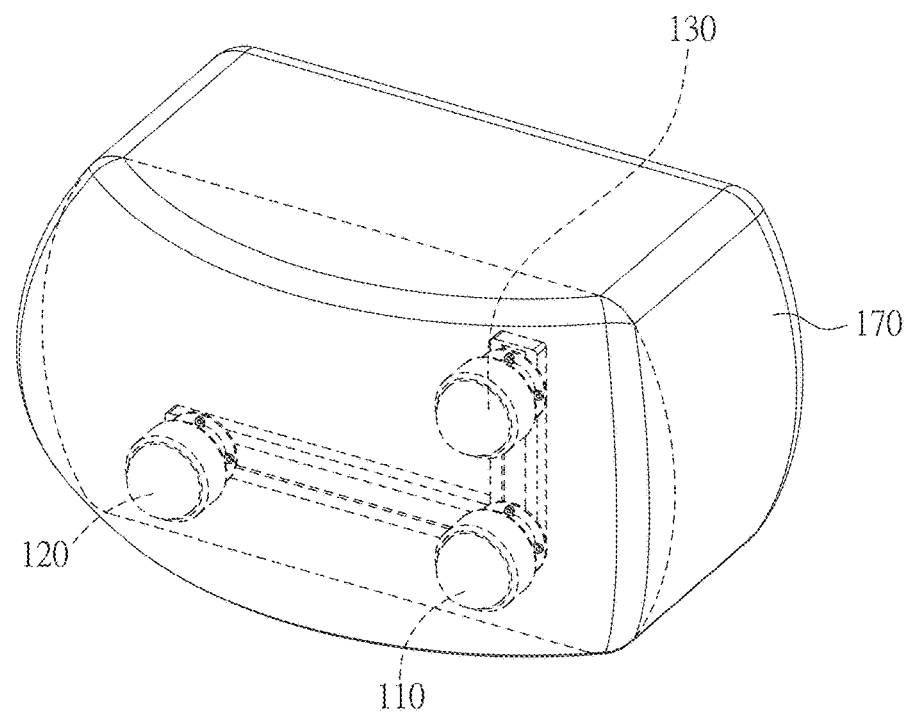
FIG. 2A is a perspective diagram of a multi-camera unit device according to an embodiment of this disclosure, wherein the multi-camera unit device includes the multi-camera unit structure of FIG. 1.
Figure 2B:
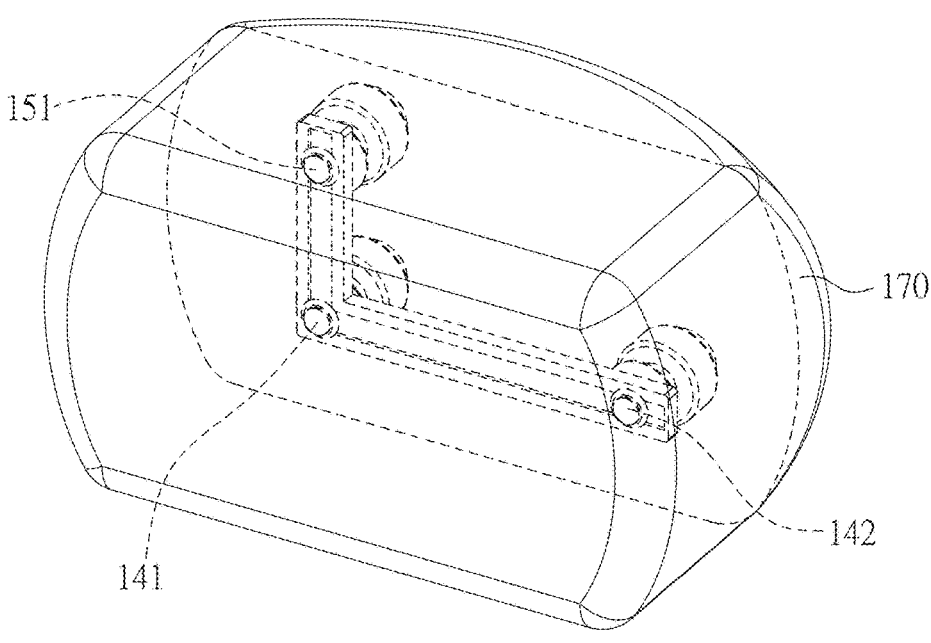
FIG. 2B is another perspective diagram of the multi-camera unit device of FIG. 2A.

FIG. 1 is a schematic diagram showing a multi-camera unit structure 100 according to an embodiment of this disclosure, and FIGS. 2A and 2B are perspective diagrams of a multi-camera unit device 10, which includes the multi-camera unit structure 100, according to an embodiment of this disclosure.

Referring to FIGS. 1 and 2A, the multi-camera unit structure 100 includes a first camera unit 110, a second camera unit 120, a third camera unit 130, a first rail unit 140, a second rail unit 150, and a calibrated-image generation unit 160. In this embodiment, the third camera unit 130 is located above the first camera unit 110. In other embodiments, the third camera unit 130 can be located below the first camera unit 110, and this disclosure is not limited. As shown in FIG. 2A, the multi-camera unit device 10 includes the above-mentioned multi-camera unit structure 100 and a casing 170. Specifically, the first camera unit 110, the second camera unit 120, the third camera unit 130, the first rail unit 140, the second rail unit 150, and the calibrated-image generation unit 160 are disposed inside the casing 170.

Referring to FIG. 1, the second camera unit 120 is distant from the first camera unit 110 with a first distance D1 in a first direction X, which is defined by the first camera unit 110 and the second camera unit 120. In other words, the first camera unit 110 and the second camera unit 120 are separated from each other with a first distance D1 in the first direction X. The first rail unit 140 lays and extends in the first direction X, and the first camera unit 110 and the second camera unit 120 are arranged on the first rail unit 140. Due to the configuration of the first rail unit 140, the first distance D1 between the first camera unit 110 and the second camera unit 120 is dynamically (or arbitrarily) adjustable. As shown in FIG. 2B, in the multi-camera unit device 10, the first camera unit 110 can be positioned and adjusted on the first rail unit 140 by the position member 141, and the second camera unit 120 can be positioned and adjusted on the first rail unit 140 by the position member 142. In this case, the position of the first camera unit 110 can be adjusted approaching the second camera unit 120, or the position of the second camera unit 120 can be adjusted approaching the first camera unit 110. That is, the first distance D1 between the first camera unit 110 and the second camera unit 120, which are disposed on the first rail unit 140, is dynamically (or arbitrarily) adjustable.

In this embodiment, the first camera unit 110 and the second camera unit 120 of the multi-camera unit structure 100 can obtain, with taking the first camera unit 110 as an imaging reference, a first DOF (depth of field) image of a target object (not shown).

Referring to FIGS. 1 and 2B, the third camera unit 130 is distant from the first camera unit 110 with a second distance D2 in a second direction Y, which is defined by the first camera unit 110 and the third camera unit 130, and the first direction X and the second direction Y together define an included angle of, for example, 90°. The third camera unit 130 and the first camera unit 110 can obtain, with taking the first camera unit 110 as an imaging reference, a second DOF image of the target object. In addition, the second rail unit 150 lays and extends in the second direction Y, and the first camera unit 110 and the third camera unit 130 are arranged on the second rail unit 150. Due to the configuration of the second rail unit 150, the second distance D2 between the first camera unit 110 and the third camera unit 130 is dynamically (or arbitrarily) adjustable. That is, the first camera unit 110 can be positioned and adjusted on the second rail unit 150 by the position member 141, and the third camera unit 130 can be positioned and adjusted on the second rail unit 150 by the position member 151. In this case, the position of the third camera unit 130 can be adjusted approaching the first camera unit 110, or the position of the first camera unit 110 can be adjusted approaching the third camera unit 130.

In this embodiment, the first camera unit 110 and the third camera unit 130 of the multi-camera unit structure 100 can obtain, with taking the first camera unit 110 as an imaging reference, a second DOF image of the target object (not shown).

The multi-camera unit structure 100 further includes the calibrated-image generation unit 160. The first camera unit 110, the second camera unit 120 and the third camera unit 130 are individually electrically connected to the calibrated-image generation unit 160. In this embodiment, the calibrated-image generation unit 160 can obtain a calibrated DOF image according to the first DOF image and the second DOF image. Specifically, the calibrated-image generation unit 160 obtains the calibrated DOF image according to multiple DOF data of corresponding pixel areas in the first DOF image and the second DOF image having higher confidences. In more details, the first DOF image includes a plurality of pixel areas, and the second DOF image also includes a plurality of pixel areas. Each of the pixel areas has one DOF data and a corresponding confidence, which can be calculated based on the following confidence equation. Regarding a pair of pixel areas, including one pixel area in the first DOF image and one corresponding pixel area in the second DOF image, the DOF data of the pixel area having a higher confidence is selected to generate the calibrated DOF image. The confidences of pixel areas (or pixels) can be calculated based on the following confidence equation. Taking the first DOF image as an example, in the following confidence equation, P(x,y,d) is the probability that the image data of a pixel (x,y) in the image obtained by the first camera unit 110 matches the image data of a corresponding pixel (x,y) in the image obtained by the second camera unit 120. Herein, d represents the vision difference between the first camera unit 110 and the second camera unit 120, and each P(x,y,d)*logP(x,y,d) can calculate the entropy of pixel (x,y), which can be realized as the uncertainty, when the vision difference is d.

$$\text{Confidence}(x, y) = \sum_{d=0}^{D-1} P(x, y, d) * \log P(x, y, d).$$

Figure 3:
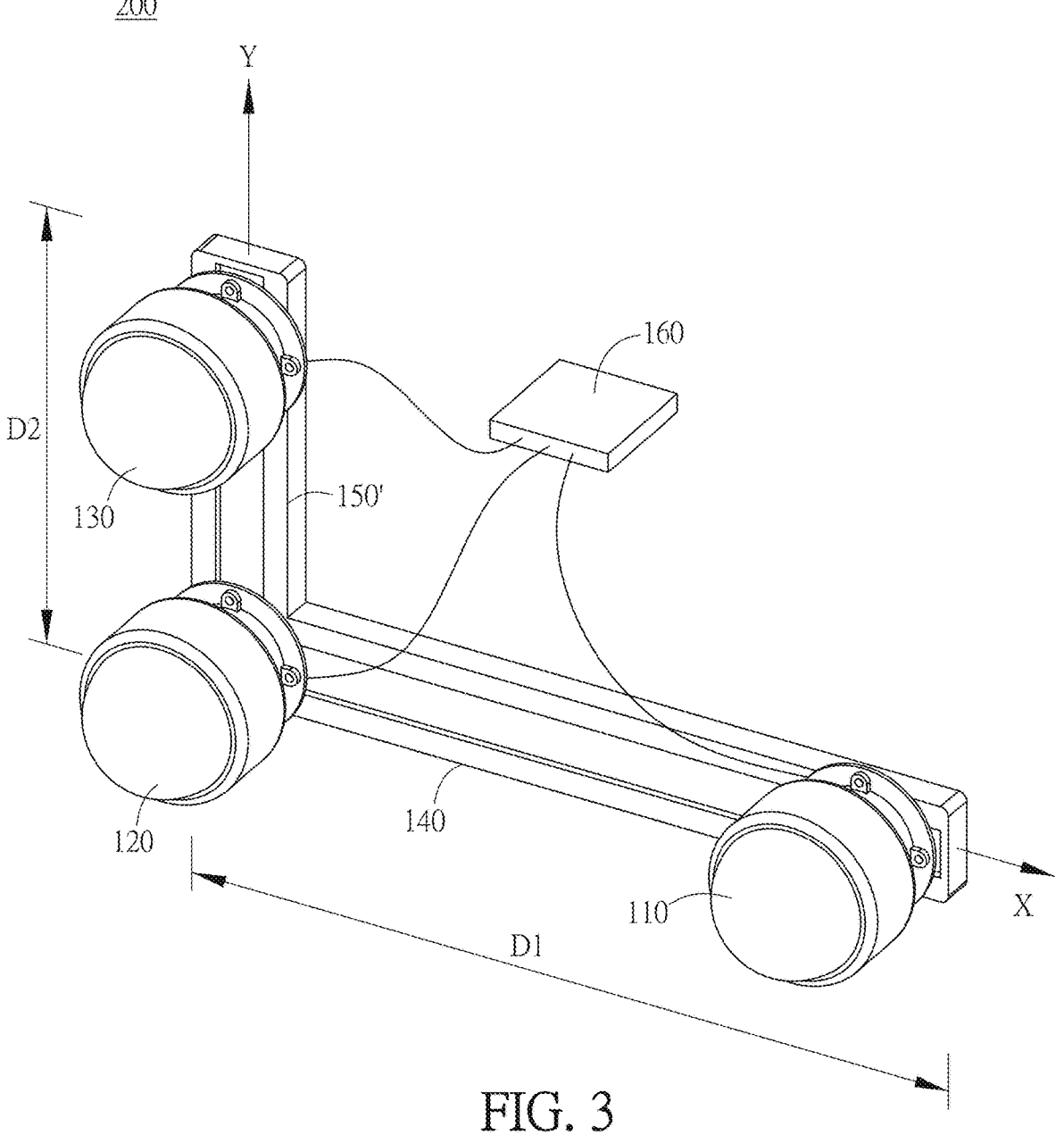
FIG. 3 is a schematic diagram showing a multi-camera unit structure according to another embodiment of this disclosure.
Figure 4A:
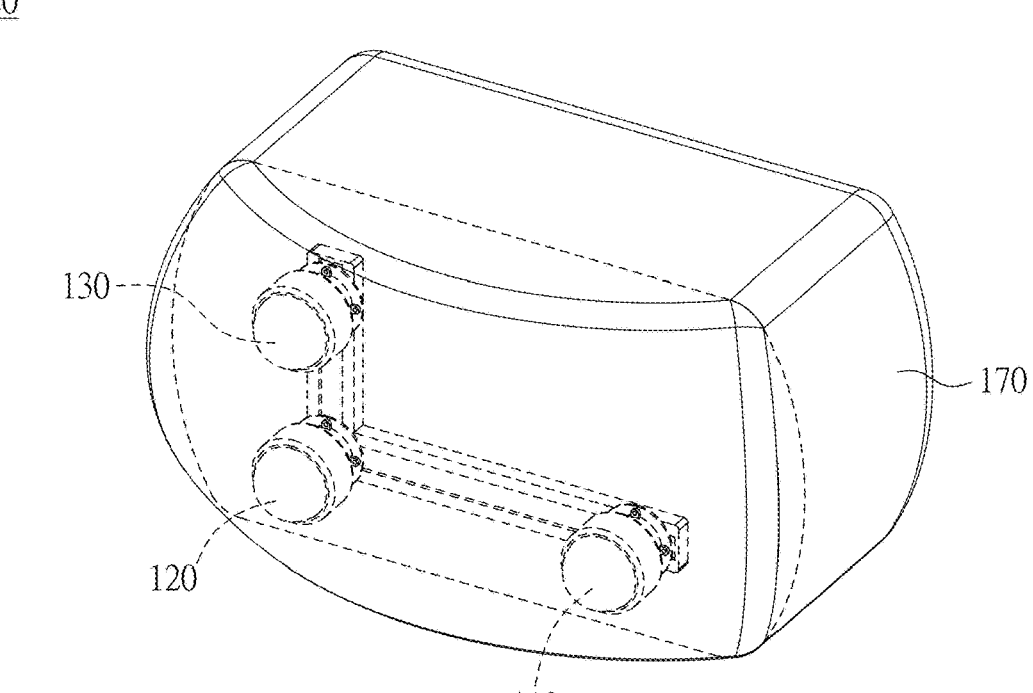
FIG. 4A is a perspective diagram of a multi-camera unit device according to an embodiment of this disclosure, wherein the multi-camera unit device includes the multi-camera unit structure of FIG. 3.

A multi-camera unit structure 200 according to another embodiment of the present disclosure will be described hereinafter. For the convenience of explanation, the same reference numbers are used for components with the same functions. In addition, the method of generating the calibrated DOF image can refer to the above embodiment, so the description thereof will be omitted. With reference to FIGS. 3 and 4A, the multi-camera unit structure 200 includes a first camera unit 110, a second camera unit 120, a third camera unit 130, a first rail unit 140, a second rail unit 150', and a calibrated-image generation unit 160. In this embodiment, the third camera unit 130 is located above the second camera unit 120. In other embodiments, the third camera unit 130 can be located below the second camera unit 120, and this disclosure is not limited. As shown in FIG. 4A, the multi-camera unit device 20 includes the above-mentioned multi-camera unit structure 200 and a casing 170. Specifically, the first camera unit 110, the second camera unit 120, the third camera unit 130, the first rail unit 140, the second rail unit 150', and the calibrated-image generation unit 160 are disposed inside the casing 170.

Referring to FIG. 3, the second camera unit 120 is distant from the first camera unit 110 with a first distance D1 in a first direction X. In other words, the first camera unit 110 and the second camera unit 120 are separated from each other with a first distance D1 in the first direction X. The first rail unit 140 lays and extends in the first direction X, and the first camera unit 110 and the second camera unit 120 are arranged on the first rail unit 140. Due to the configuration of the first rail unit 140, the first distance D1 between the first camera unit 110 and the second camera unit 120 is dynamically (or arbitrarily) adjustable.

Figure 4B:
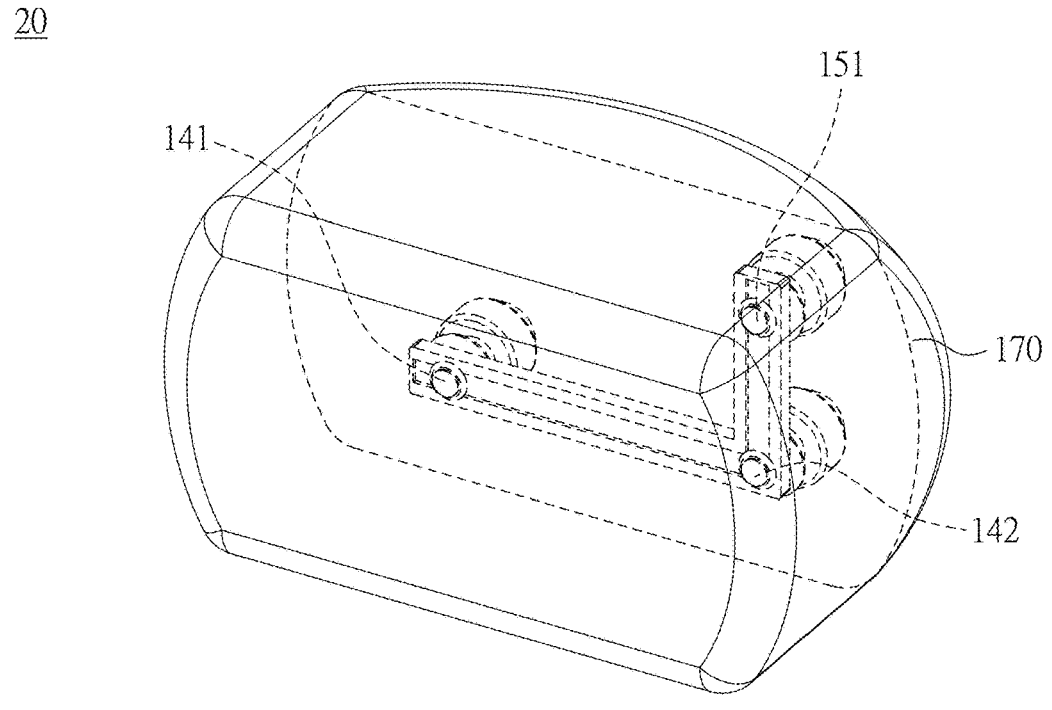
FIG. 4B is another perspective diagram of the multi-camera unit device of FIG. 4A.

As shown in FIG. 4B, in the multi-camera unit device 20, the first camera unit 110 can be positioned and adjusted on the first rail unit 140 by the position member 141, and the second camera unit 120 can be positioned and adjusted on the first rail unit 140 by the position member 142. In this case, the position of the first camera unit 110 can be adjusted approaching the second camera unit 120, or the position of the second camera unit 120 can be adjusted approaching the first camera unit 110. That is, the first distance D1 between the first camera unit 110 and the second camera unit 120, which are disposed on the first rail unit 140, is dynamically (or arbitrarily) adjustable.

In this embodiment, the first camera unit 110 and the second camera unit 120 of the multi-camera unit structure 200 can obtain, with taking the second camera unit 120 as an imaging reference, a first DOF image of a target object (not shown).

Referring to FIGS. 3 and 4B, the third camera unit 130 is distant from the second camera unit 120 with a second distance D2 in a second direction Y, which is defined by the second camera unit 120 and the third camera unit 130, and the first direction X and the second direction Y together define an included angle of, for example, 90°. The third camera unit 130 and the second camera unit 120 can obtain, with taking the second camera unit 120 as an imaging reference, a second DOF image of the target object. In addition, the second rail unit 150' lays and extends in the second direction Y, and the second camera unit 120 and the third camera unit 130 are arranged on the second rail unit 150'. Due to the configuration of the second rail unit 150', the second distance D2 between the second camera unit 120 and the third camera unit 130 is dynamically (or arbitrarily) adjustable. That is, the second camera unit 120 can be positioned and adjusted on the second rail unit 150' by the position member 142, and the third camera unit 130 can be positioned and adjusted on the second rail unit 150' by the position member 151. In this case, the position of the third camera unit 130 can be adjusted approaching the second camera unit 120, or the position of the second camera unit 120 can be adjusted approaching the third camera unit 130.

In this embodiment, the second camera unit 120 and the third camera unit 130 of the multi-camera unit structure 200 can obtain, with taking the second camera unit 120 as an imaging reference, a second DOF image of the target object (not shown).

The multi-camera unit structure 200 further includes the calibrated-image generation unit 160. The first camera unit 110, the second camera unit 120 and the third camera unit 130 are individually electrically connected to the calibrated-image generation unit 160. In this embodiment, the calibrated-image generation unit 160 can obtain a calibrated DOF image according to the first DOF image and the second DOF image.

In summary, the multi-camera unit structure of this disclosure includes a first camera unit, a second camera unit, a third camera unit and a calibrated-image generation unit. The second camera unit is distant from the first camera unit with a first distance in a first direction. The first direction is defined by the first camera unit and the second camera unit. The first camera unit and the second camera unit, with taking the first camera unit as an imaging reference, obtain a first DOF image of a target object. The third camera unit is distant from the first camera unit or the second camera unit with a second distance in a second direction. The second direction is defined by the third camera unit and the first camera unit or by the third camera unit and the second camera, and the first direction and the second direction define an included angle. The third camera unit and the first camera unit, with taking the first camera unit as an imaging reference, obtain a second DOF image of the target object, or the third camera unit and the second camera unit, with taking the second camera unit as an imaging reference, obtain the second DOF image of the target object. The calibrated-image generation unit obtains a calibrated DOF image according to the first DOF image and the second DOF image. In addition, the multi-camera unit device of this disclosure includes the above-mentioned multi-camera unit structure and a casing for accommodating the multi-camera unit structure. Based on the design of this disclosure, a first DOF image and a second DOF image can be individually obtained, and then the confidences of corresponding pixel areas in the first DOF image and the second DOF image are compared. Afterwards, the calibrated DOF image can be generated based on the DOF data of the pixel areas having higher confidences in the first DOF image and the second DOF image, thereby obtaining a more accurate depth image and a more accurate 3D model.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A multi-camera unit structure, comprising:
   a first camera unit;
   a second camera unit being distant from the first camera unit with a first distance in a first direction, wherein the first direction is defined by the first camera unit and the second camera unit, and the first camera unit and the second camera unit, with taking the first camera unit as an imaging reference, obtain a first DOF (depth of field) image of a target object;

a third camera unit being distant from the first camera unit or the second camera unit with a second distance in a second direction, wherein the second direction is defined by the third camera unit and the first camera unit or by the third camera unit and the second camera, the first direction and the second direction define an included angle, and the third camera unit and the first camera unit, with taking the first camera unit as an imaging reference, obtain a second DOF image of the target object, or the third camera unit and the second camera unit, with taking the second camera unit as an imaging reference, obtain the second DOF image of the target object; and a calibrated-image generation unit obtaining a calibrated DOF image according to the first DOF image and the second DOF image.

2. The multi-camera unit structure of claim 1, wherein the included angle defined by the first direction and the second direction is 90°.

3. The multi-camera unit structure of claim 1, further comprising:

a first rail unit extending in the first direction, wherein each of the first camera unit and the second camera unit is arranged on the first rail unit through a position member.

4. The multi-camera unit structure of claim 3, further comprising:

a second rail unit extending in the second direction, wherein the third camera unit is arranged on the second rail unit through a position member.

5. The multi-camera unit structure of claim 1, further comprising:

a second rail unit extending in the second direction, wherein the third camera unit is arranged on the second rail unit through a position member.

6. The multi-camera unit structure of claim 1, wherein the calibrated-image generation unit obtains the calibrated DOF image according to multiple DOF data of corresponding pixel areas in the first DOF image and the second DOF image having higher confidences.

7. A multi-camera unit device, comprising:

a first camera unit;

a second camera unit being distant from the first camera unit with a first distance in a first direction, wherein the first direction is defined by the first camera unit and the second camera unit, and the first camera unit and the second camera unit, with taking the first camera unit as an imaging reference, obtain a first DOF (depth of field) image of a target object;

a third camera unit being distant from the first camera unit or the second camera unit with a second distance in a second direction, wherein the second direction is defined by the third camera unit and the first camera unit or by the third camera unit and the second camera, the first direction and the second direction define an included angle, and the third camera unit and the first camera unit, with taking the first camera unit as an imaging reference, obtain a second DOF image of the target object, or the third camera unit and the second camera unit, with taking the second camera unit as an imaging reference, obtain the second DOF image of the target object;

a calibrated-image generation unit obtaining a calibrated DOF image according to the first DOF image and the second DOF image; and a casing, wherein the first camera unit, the second camera unit, the third camera unit and the calibrated-image generation unit are disposed in the casing.

8. The multi-camera unit device of claim 7, wherein the included angle defined by the first direction and the second direction is 90°.

9. The multi-camera unit device of claim 7, further comprising:

a first rail unit disposed in the casing and extending in the first direction, wherein each of the first camera unit and the second camera unit is arranged on the first rail unit through a position member.

10. The multi-camera unit device of claim 9, further comprising:

a second rail unit disposed in the casing and extending in the second direction, wherein the third camera unit is arranged on the second rail unit through a position member.

11. The multi-camera unit device of claim 7, further comprising:

a second rail unit disposed in the casing and extending in the second direction, wherein the third camera unit is arranged on the second rail unit through a position member.

12. The multi-camera unit device of claim 7, wherein the calibrated-image generation unit obtains the calibrated DOF image according to multiple DOF data of corresponding pixel areas in the first DOF image and the second DOF image having higher confidences.

* * * * *